United States Patent
Jang et al.

(10) Patent No.: US 12,411,087 B2
(45) Date of Patent: Sep. 9, 2025

(54) JOINT HISTOGRAM BASED FLUORESCENT SIGNAL UNMIXING METHOD AND DEVICE

(71) Applicant: Korea Advanced Institute of Science and Technology, Daejeon (KR)

(72) Inventors: Jae-Byum Jang, Daejeon (KR);
Hyunwoo Kim, Daejeon (KR);
Young-Gyu Yoon, Daejeon (KR);
Hoyeon Nam, Daejeon (KR);
Junyoung Seo, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 497 days.

(21) Appl. No.: 17/931,711

(22) Filed: Sep. 13, 2022

(65) Prior Publication Data
US 2023/0091480 A1    Mar. 23, 2023

(30) Foreign Application Priority Data

Sep. 16, 2021  (KR) .................. 10-2021-0123582
Aug. 3, 2022  (KR) .................. 10-2022-0096449

(51) Int. Cl.
G01N 21/64    (2006.01)

(52) U.S. Cl.
CPC ..... *G01N 21/6456* (2013.01); *G01N 21/6458* (2013.01)

(58) Field of Classification Search
CPC ....... G01N 2021/6417; G01N 21/6458; G01N 21/6456
See application file for complete search history.

(56) References Cited

U.S. PATENT DOCUMENTS

| | | | |
|---|---|---|---|
| 11,210,535 B1 * | 12/2021 | Pandey | G06V 20/58 |
| 2018/0121709 A1 * | 5/2018 | Garsha | G01N 1/30 |

FOREIGN PATENT DOCUMENTS

| | | | | |
|---|---|---|---|---|
| JP | 6031151 B2 | 11/2016 | | |
| KR | 10-2021-0087869 A | 7/2021 | | |
| WO | WO-2014195193 A1 * | 12/2014 | ......... | G06K 9/00127 |

OTHER PUBLICATIONS

Luengo Hendriks, Cris L et al. Automatic Channel Unmixing for High-Throughput Quantitative Analysis of Fluorescence Images. Optics express 15.19 (2007): 12306-12317. Web. (Year: 2007).*

Luengo Hendriks, Cris L et al. "Three-Dimensional Morphology and Gene Expression in the *Drosophila blastoderm* at Cellular Resolution I: Data Acquisition Pipeline." Genome biology 7.12 (2006): n. pag. Web. (Year: 2006).*

Hendriks, C. L. L., et al., "Automatic channel unmixing for high-throughput quantitative analysis of fluorescence images", Optics Express, vol. 15, No. 19, 2007, pp. 12306-12317.

* cited by examiner

*Primary Examiner* — John R Wallace
(74) *Attorney, Agent, or Firm* — Hamilton, Brook, Smith & Reynolds, P.C.

(57) ABSTRACT

The present disclosure relates to a method and device for unmixing fluorescent signals based on a joint histogram. The method and device may be configured to obtain a plurality of images of a plurality of fluorescent materials marked in different biomolecules and to unmix the signals of the fluorescent materials based on at least one joint histogram index defined between the images of each of pairs each including two or more of the obtained images. According to the present disclosure, the joint histogram index may include at least one of Kullback-Leibler divergence, cross-entropy, or Rand-index.

17 Claims, 4 Drawing Sheets

JOINT HISTOGRAM BASED FLUORESCENT SIGNAL UNMIXING METHOD AND DEVICE

CROSS-REFERENCES TO RELATED APPLICATIONS

This application is based on and claims priority under 35 U.S.C. 119 to Korean Patent Application Nos. 10-2021-0123582, filed on Sep. 16, 2021, and 10-2022-0096449, filed on Aug. 3, 2022 in the Korean intellectual property office, the disclosures of which are herein incorporated by reference in their entireties.

TECHNICAL FIELD

The present disclosure relates to a method and device for unmixing fluorescent signals based on a joint histogram.

BACKGROUND OF THE DISCLOSURE

Immuno-oncology is an anti-cancer drug that destroys a cancer cell by reinforcing a patient's immune system, and is a next-generation anti-cancer drug which has a very excellent effect and a small side effect and can reduce a relapse possibility compared to the existing chemical/targeted anti-cancer drug that loses its effect due to a tolerance. The immuno-oncology market currently occupies 15% of a total anti-cancer drug market. It is expected that the immuno-oncology market will have the market size of about 87 trillion won up to the year 2022 and a total market share thereof will rise up to about 40%. After an immuno-oncology was first developed in 2000, a total of six types of immuno-oncology were approved by the Food and Drug Administration (FDA) in the U.S. with respect to eleven cancers for the past twenty years, but there is a great deviation in an anti-cancer effect for each patient and cancer type. In order to develop an optimal immune anti-cancer drug for each patient and for each of various types of cancer, it is essential to simultaneously monitor and analyze many immune bio markers within a cancer tissue. However, five or more biomolecules cannot be simultaneously monitored through an optical microscope that is used to monitor biomolecules within a tissue in most of labs, hospitals, and companies due to the overlapping of fluorescent molecule emission spectra.

Accordingly, in line with a rapid market growth trend, there is a need for a multi-molecular spatial profiling technology capable of monitoring many immune bio markers within a tissue, a competition between global pharmaceutical companies is deepened, and an aggressive investment is made. Furthermore, even in the academic world, research results using a cytometry by time of flight (CyTOF) technology that is most used in cancer analysis, among multi-molecular spatial profiling technologies, are increasing continuously for the past ten years. However, the existing multi-molecular spatial profiling technologies including the CyTOF technology are not widely used in the development of immuno-oncology, the discovery of a new bio marker, and the prediction of immuno-oncology reactivity due to several disadvantages, such as that expensive and special equipment is required, a process is complicated, an imaging speed is low, and a sample is broken in an imaging process.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Accordingly, there is a need for a low-cost, high-efficiency, and no-damage multi-molecular spatial profiling technology in order to recommend optimal immuno-oncology for each patient and develop new immuno-oncology.

The present disclosure proposes a method and device for unmixing fluorescent signals based on a joint histogram.

In various embodiments, a method of an electronic device according to the present disclosure may include obtaining a plurality of images of a plurality of fluorescent materials marked in different biomolecules and unmixing signals of the fluorescent materials based on at least one joint histogram index defined between the images of each of pairs each including two or more of the obtained images.

In various embodiments, an electronic device may include a memory and a processor connected to the memory and configured to execute at least one instruction that is stored in the memory. The processor may be configured to obtain a plurality of images of a plurality of fluorescent materials marked in different biomolecules and to unmix signals of the fluorescent materials based on at least one joint histogram index defined between the images of each of pairs each including two or more of the obtained images.

According to the present disclosure, fluorescent materials having similar emission spectra can be distinguished based on a joint histogram. That is, according to the present disclosure, an imaging process can be minimized and fluorescent materials can be distinguished through the minimization of joint histogram indices. Specifically, according to the present disclosure, N types of fluorescent materials can be distinguished through only N-times imaging processes. In addition, in the present disclosure, through the minimization of joint histogram indices, mathematical complexity for distinguishing between fluorescent materials can be greatly reduced, and the accuracy of the distinguishment can be improved. Furthermore, according to the present disclosure, fluorescent materials can be simultaneously distinguished through only one dyeing for biomolecules without repetitive dyeing. Accordingly, according to the present disclosure, biomolecules can be efficiently monitored because fluorescent materials having similar emission spectra can be efficiently distinguished. Accordingly, since low-cost, high-efficiency, and no-damage spatial profiling is made possible, optimal immuno-oncology can be recommended for each patient and new immuno-oncology can be developed.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

A joint histogram indicates a signal intensity relation between corresponding voxels in multiple images. In this case, the voxel is a value of a normal lattice unit in a three-dimensional (3-D) space. The 3-D space may consist of an image plane (x-y plane) and an image channel plane. Representative indices (hereinafter referred to as "joint histogram indices") that are derived from the joint histogram include Kullback-Leibler divergence, cross-entropy, Rand-index, etc.

Kullback-Leibler divergence is a function which may be used to calculate a difference between two different probability distributions, and represents a difference between information entropies. Such Kullback-Leibler divergence is defined like [Equation 1].

$$D_{KL}(X \mid Y) = \sum_i X(i) \log \frac{X(i)}{Y(i)} \qquad \text{[Equation 1]}$$

Cross-entropy is an average number of bits that are necessary to distinguish between two probability distributions. Such cross-entropy is defined like [Equation 2].

$$H(X,Y) = E_X[-\log Y] \qquad \text{[Equation 2]}$$

Rand-index is a similarity measurement value between two data clusterings. In this case, an overlap between two data clusterings, that is, X={X1, X2, . . . , Xi} and Y={Y1, Y2, . . . , Yj}, may be indicated in the form of a partition table such as [Table 1]. Such Rand-index is defined like [Equation 3].

TABLE 1

|  | $Y_1$ | $Y_2$ | . . . | $Y_j$ | Sum |
|---|---|---|---|---|---|
| $X_1$ | $n_{11}$ | $n_{12}$ | . . . | $n_{1j}$ | $a_1$ |
| $X_2$ | $n_{21}$ | $n_{22}$ | . . . | $n_{2j}$ | $a_1$ |
| . | . | . | ⋱ | . | . |
| . | . | . |  | . | . |
| . | . | . |  | . | . |
| $X_i$ | $n_{i1}$ | $n_{i2}$ | . . . | $n_{ij}$ | $a_i$ |
| Sum | $b_1$ | $b_2$ | . . . | $b_j$ |  |

$$ARI = \frac{\sum_{ij}\binom{n_{ij}}{2} - [\sum_i\binom{a_i}{2}\sum_j\binom{b_j}{2}]/\binom{n}{2}}{\frac{1}{2}[\sum_i\binom{a_i}{2} + \sum_j\binom{b_j}{2}] - [\sum_i\binom{a_i}{2} + \sum_j\binom{b_j}{2}]/\binom{n}{2}} \qquad \text{[Equation 3]}$$

Hereinafter, the present disclosure proposes a technology capable of simultaneously monitoring 20 or more biomolecules although fluorescent molecules the emission spectra of which overlap through the minimization of at least one of joint histogram indices. Hereinafter, various embodiments of the present disclosure are described with reference to the accompanying drawings.

Figure 1:
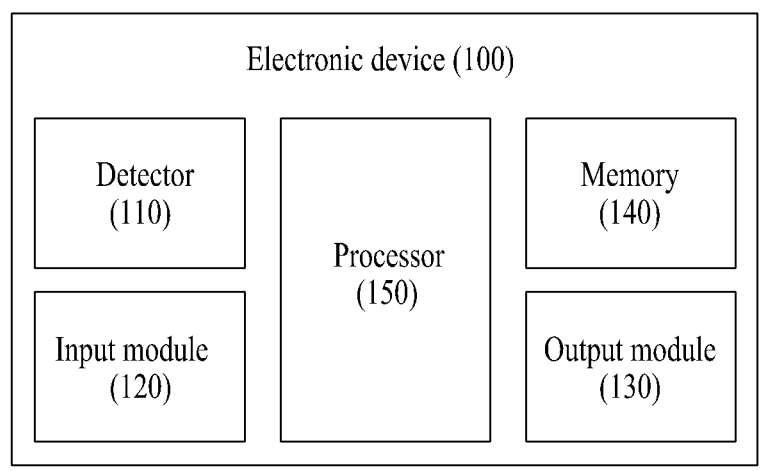
FIG. 1 is a block diagram illustrating an electronic device according to various embodiments of the present disclosure.

FIG. 1 is a block diagram illustrating an electronic device 100 according to various embodiments of the present disclosure.

Referring to FIG. 1, the electronic device 100 according to various embodiments of the present disclosure may include at least any one of a detector 110, an input module 120, an output module 130, a memory 140 or a processor 150. In an embodiment, at least any one of the components of the electronic device 100 may be omitted, or more components may be added to the electronic device 100.

The detector 110 may photograph an image of a sample. In this case, the detector 110 may be installed at a predetermined location of the electronic device 100, and may photograph an image of a sample. For example, the detector 110 may include at least any one of a scientific complementary metal-oxide-semiconductor (sCMOS) camera, a photo multiplier tube (PMT), or equipment capable of measuring the intensity of light and representing the measured intensity in the form of an image.

The input module 120 may receive, from the outside of the electronic device 100, an instruction or data to be used in at least any one of the components of the electronic device 100. In this case, the input module 120 may include at least any one of an input device or a reception device. For example, the input device may include at least one of a microphone, a mouse or a keyboard. In an embodiment, the input device may include at least one of touch circuitry configured to detect a touch or a sensor circuit configured to measure the intensity of a force generated by a touch. The reception device may include at least any one of a wireless reception device or a wired reception device.

The output module 130 may provide information to the outside of the electronic device 100. In this case, the output module 130 may include at least any one of a display device or a transmission device. For example, the display device may include at least any one of a display, a hologram device, or a projector. In an embodiment, the display device may be implemented as a touch screen by being assembled with at least any one of the touch circuitry or sensor circuit of the input module 120. The transmission device may include at least any one of a wireless transmission device or a wired transmission device.

According to an embodiment, the reception device and the transmission device may be integrated into one communication module. The communication module may support communication between the electronic device 100 and an external device (not illustrated). The communication module may include at least any one of a wireless communication module or a wired communication module. In this case, the wireless communication module may include at least any one of a wireless reception device or a wireless transmission device. Furthermore, the wireless communication module may support at least any one of a long-distance communication method or a short-distance communication method. The short-distance communication method may include at least any one of Bluetooth, WiFi direct, or infrared data association (IrDA), for example. The wireless communication module may perform communication by using the long-distance communication method over a network. The network may include at least any one of a cellular network, the Internet, or a computer network, such as a local area network (LAN) or a wide area network (WAN), for example. The wired communication module may include at least any one of a wired reception device or a wired transmission device.

The memory 140 may store at least any one of a program or data that is used by at least any one of the components of the electronic device 100. For example, the memory 140 may include at least any one of a volatile memory or a nonvolatile memory.

The processor 150 may control at least any one of the components of the electronic device 100 by executing a program of the memory 140, and may perform data processing or operations. The processor 150 may obtain a plurality of images with respect to a plurality of fluorescent materials that are marked in different biomolecules. Furthermore, the processor 150 may be configured to unmix the signals of fluorescent materials based on at least one joint histogram index that has been defined between images of each pair, with respect to each of the pairs each including two or more of obtained images. In this case, the joint histogram index may include at least one of Kullback-Leibler divergence, cross-entropy, or Rand-index.

Figure 2:
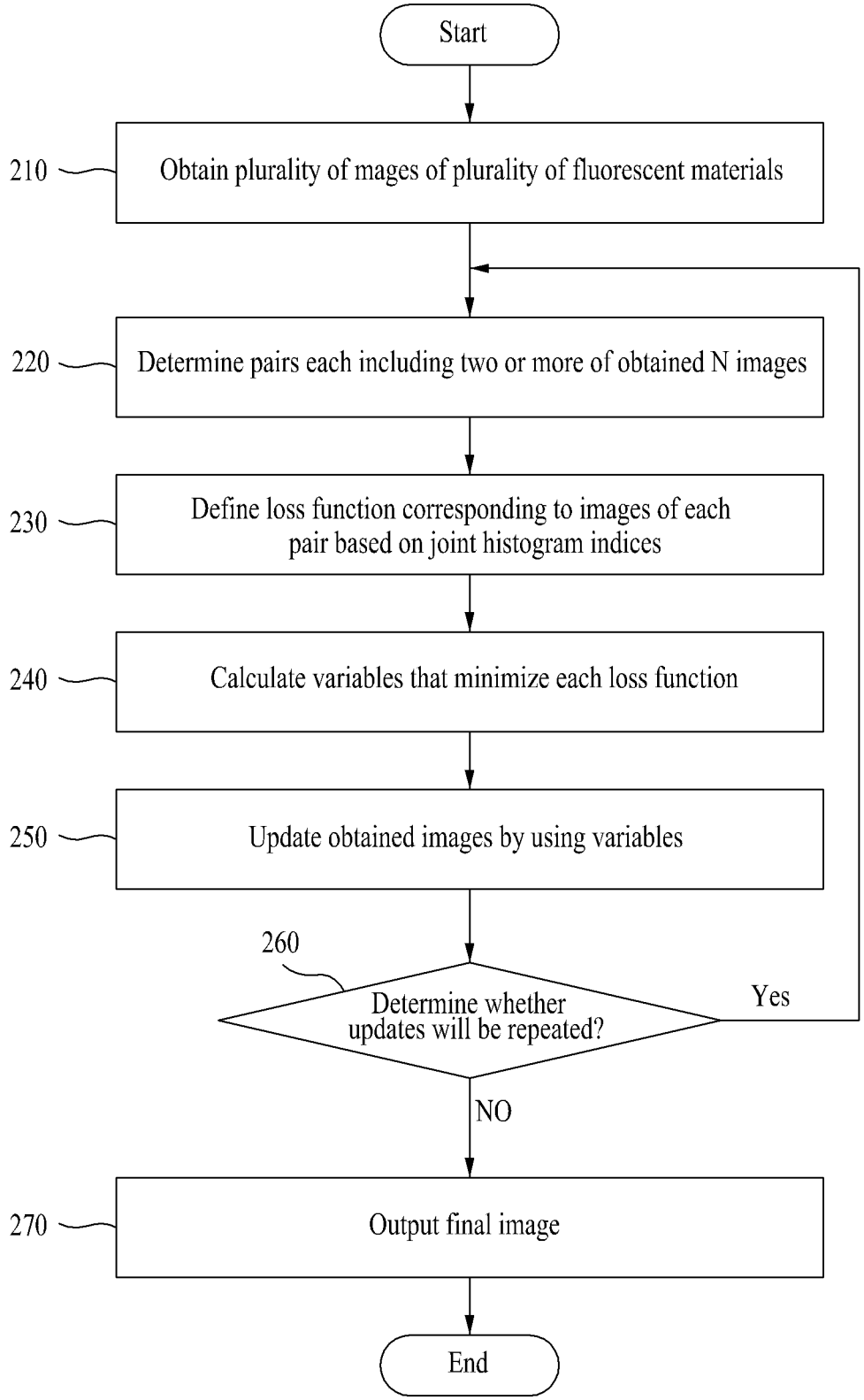
FIG. 2 is a flowchart illustrating a method of unmixing, by the electronic device, fluorescent signals based on a joint histogram according to various embodiments of the present disclosure.

FIG. 2 is a flowchart illustrating a method of unmixing, by the electronic device 100, fluorescent signals based on a joint histogram according to various embodiments of the present disclosure.

Referring to FIG. 2, in step 210, the electronic device 100 may obtain a plurality of mages, for example, N images (e.g., IMG1, IMG2, . . . , IMGN−1, IMGN) of a plurality of fluorescent materials, for example, N fluorescent materials that are marked in different biomolecules. In this case, the processor 150 may obtain the plurality of images of the plurality of fluorescent materials having emission spectra, respectively, which overlap in a detection wavelength. The detection wavelength may be set to include high points in the emission spectra of the fluorescent materials. That is, if the detection wavelength is set to include the high points in the emission spectra of the fluorescent materials the emission spectra of which overlap and is subjected to fluorescent imaging, the N images in which the signals of corresponding fluorescent materials are mixed may be obtained. In this case, N may be a number equal to or greater than 2. In other words, the processor 150 may obtain two or more images of two or more fluorescent materials. In this case, each of the plurality of images may be defined as a matrix, such as [Equation 4].

$$\begin{bmatrix} IMG_1 \\ IMG_2 \\ \vdots \\ IMG_N \end{bmatrix} = \begin{bmatrix} 1 & \alpha_{1,2} & \cdots & \alpha_{1,N} \\ \alpha_{2,1} & 1 & \ddots & \vdots \\ \vdots & \ddots & \ddots & \alpha_{N-1,N} \\ \alpha_{N,1} & \cdots & \alpha_{N,N-1} & 1 \end{bmatrix} \begin{bmatrix} F_1 \\ F_2 \\ \vdots \\ F_N \end{bmatrix}$$ [Equation 4]

wherein $\alpha_{i,j}$ indicates the brightness coefficient of each of the fluorescent materials in the plurality of images, respectively. $F_N$ indicates each of the fluorescent materials.

In step 220, the electronic device 100 may determine pairs each including two or more of the obtained N images. In this case, the processor 150 may determine the pairs based on all of possible permutation combinations from the obtained N images.

Next, in step 230, the electronic device 100 may define a loss function corresponding to the images of each pair (IMGX, IMGY) based on at least one of joint histogram indices. The joint histogram indices may include Kullback-Leibler divergence, cross-entropy, and Rand-index. The processor 150 may define a loss function according to Kullback-Leibler divergence as in [Equation 5]. The processor 150 may define a loss function according to cross-entropy as in [Equation 6]. The processor 150 may define a loss function according to Rand-index as in [Equation 7].

$L_X(\alpha) = D_{KL}(\text{IMG}X - \alpha \times \text{IMG}Y \| \text{IMG}Y)$ $L_Y(\beta) = D_{KL}(\text{IMG}X \| \text{IMG}Y - \beta \times \text{IMG}X)$ [Equation 5]

$L_X(\alpha) = H(\text{IMG}X - \alpha \times \text{IMG}Y, \text{IMG}Y)$ $L_Y(\beta) = H(\text{IMG}X, \text{IMG}Y - \beta \times \text{IMG}X)$ [Equation 6]

$L_X(\alpha) = \text{ARI}(\text{IMG}X - \alpha \times \text{IMG}Y, \text{IMG}Y)$ $L_Y(\beta) = \text{ARI}(\text{IMG}X, \text{IMG}Y - \beta \times \text{IMG}X)$ [Equation 7]

Next, in step 240, the electronic device 100 may calculate variables $\hat{\alpha}$ and $\hat{\beta}$ that minimize each loss function. The processor 150 may calculate the variables $\hat{\alpha}$ and $\hat{\beta}$ as in [Equation 8].

$$\hat{\alpha} = \underset{\alpha}{\operatorname{argmin}} L_1(\alpha)$$
$$\hat{\beta} = \underset{\beta}{\operatorname{argmin}} L_2(\beta)$$ [Equation 8]

In step 250, the electronic device 100 may update the obtained images by using the variables $\hat{\alpha}$ and $\hat{\beta}$. The processor 150 may update the obtained images by using the variables $\hat{\alpha}$ and $\hat{\beta}$ as in [Equation 9]. Accordingly, the electronic device 100 may newly obtain the updated images. In this case, the signals of the fluorescent materials in the newly obtained images may be unmixed.

$\text{IMG}X' = \text{IMG}X - \hat{\alpha} \times \text{IMG}Y$ $\text{IMG}Y' = \text{IMG}Y - \hat{\beta} \times \text{IMG}X$ [Equation 9]

In step 260, the electronic device 100 may determine updates for the newly obtained images will be repeated. The processor 150 may determine whether the number of updates for the obtained images, that is, the number of repetitions in step 220 to step 250 has reached a determined number. In this case, if it is determined that the number of repetitions has not reached the determined number, the processor 150 may determine that the updates need to be performed. If it is determined that the number of repetitions has reached the determined number, the processor 150 may determine that the updates need not to be performed.

If it is determined that the updates need to be performed in step 260, the electronic device 100 may return to step 220, and may repeatedly perform step 220 to step 250. That is, the electronic device 100 may repeatedly perform step 220 to step 250, based on images that are newly obtained in step 250. Accordingly, the signals of the fluorescent materials may be gradually unmixed. In such a manner, the processor 150 may update all of the obtained images by using the matrix consisting of the variables $\hat{\alpha}$ and $\hat{\beta}$ calculated from the images of all the pairs as in [Equation 10]. Accordingly, the electronic device 100 may newly obtain the updated images. In this case, the signals of the fluorescent materials in the newly obtained images may be unmixed. Thereafter, the electronic device 100 may proceed to step 260.

$$\begin{bmatrix} X_{1(k+1)} \\ X_{2(k+1)} \\ \vdots \\ X_{N(k+1)} \end{bmatrix} = \begin{bmatrix} 1 & -\gamma\hat{\alpha}_{1,2(k)} & \cdots & -\gamma\hat{\alpha}_{1,N(k)} \\ -\gamma\hat{\alpha}_{2,1(k)} & 1 & \ddots & \vdots \\ \vdots & \ddots & \ddots & -\gamma\hat{\alpha}_{N-1,N(k)} \\ -\gamma\hat{\alpha}_{N,1(k)} & \cdots & -\gamma\hat{\alpha}_{N,N-1(k)} & 1 \end{bmatrix} \begin{bmatrix} X_{1(k)} \\ X_{2(k)} \\ \vdots \\ X_{N(k)} \end{bmatrix}$$ [Equation 10]

wherein k may indicate the number of repetitions, $\gamma$ may indicate an update speed, and $X_{i,k}$ may indicate an i-th image after a k-th repetition.

If it is determined that the updates need not to be performed in step 260, in step 270, the electronic device 100 may output the final image. In this case, the processor 150 may output the final image by applying a positive constraint to the finally obtained images as in [Equation 11].

$$IMGN_{FNL} = \max(IMGN, 0) \quad \text{[Equation 11]}$$

Figure 3:
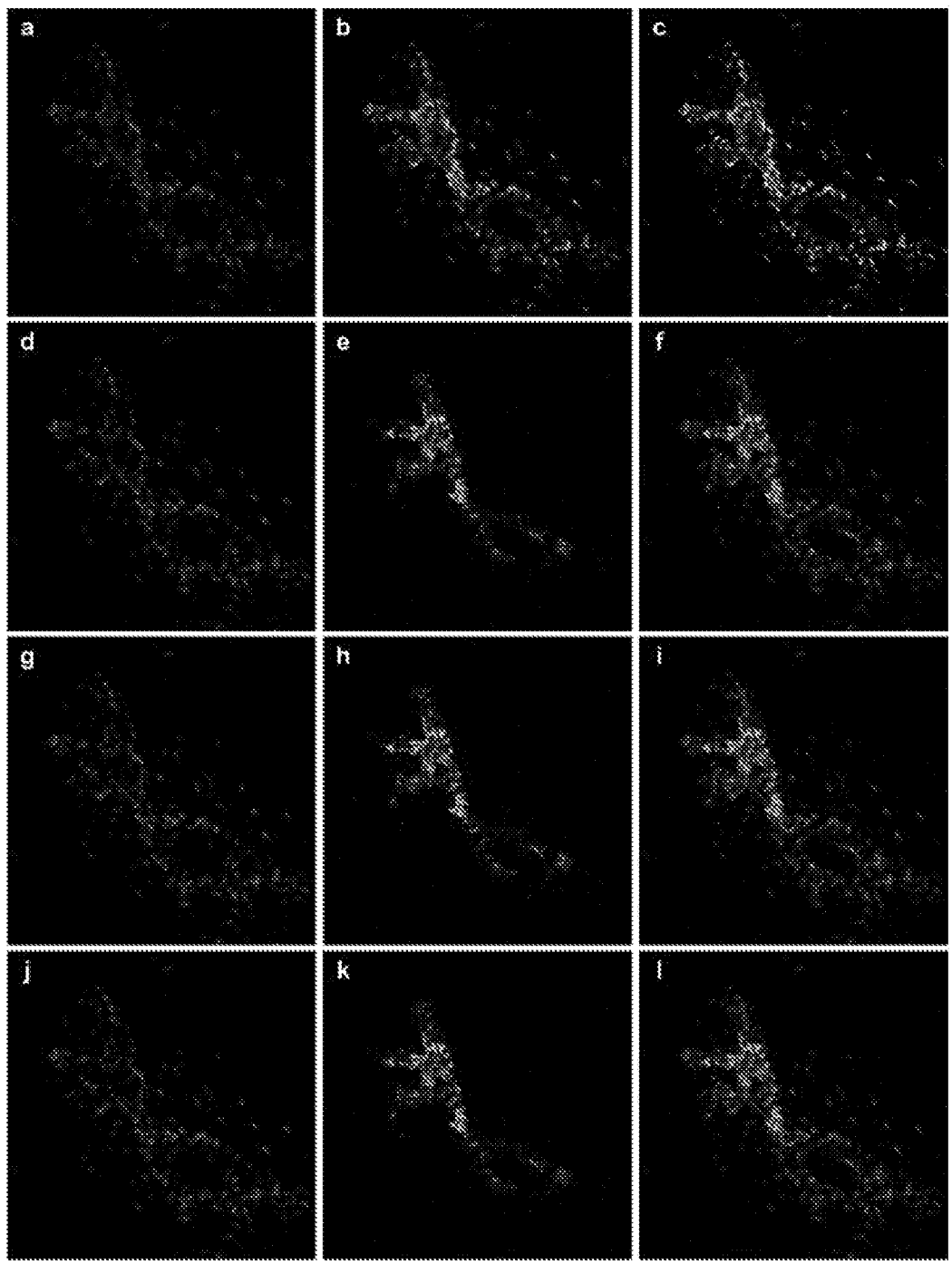
FIGS. 3 and 4 are diagrams illustrating experiment results for verifying the present disclosure.
Figure 4:
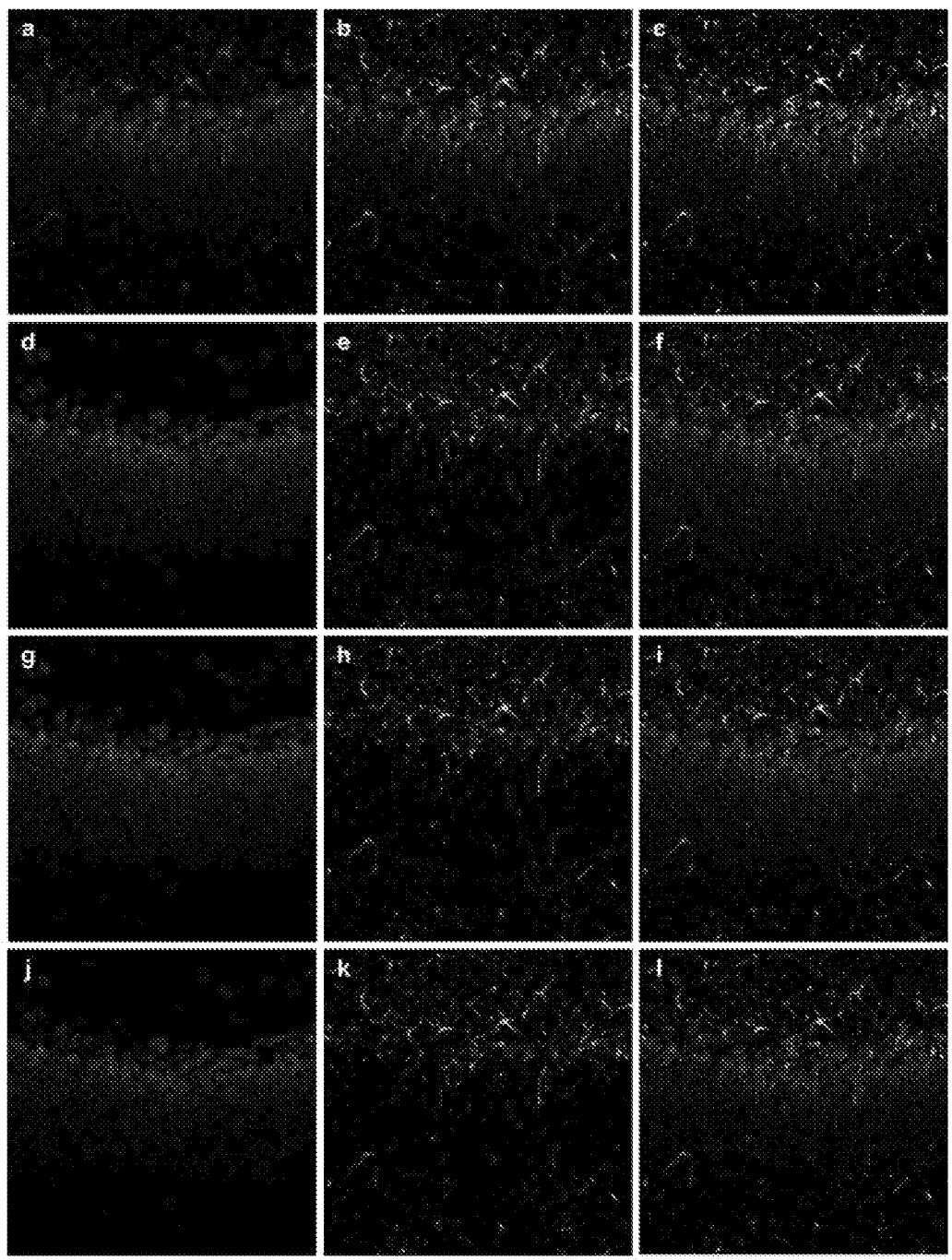

According to the present disclosure, two fluorescent molecule signals the emission spectra of which overlap can be unmixed by using only one laser through a fluorescent signal unmixing technology based on a joint histogram. Such unmixing was verified as experiment results of FIGS. 3 and 4. FIGS. 3 and 4 are diagrams illustrating the experiment results for verifying the present disclosure.

FIG. 3 illustrates valid verification results in an FFPE breast tissue, and illustrates the results obtained by applying the fluorescent signal unmixing technology based on a joint histogram after histone and keratin proteins of the FFPE breast tissue were dyed with fluorescent molecules CF488A and ATTO532 the emission spectra overlap, respectively. (a), (b), and (c) of FIG. 3 are images before signal unmixing. In this case, (a) of FIG. 3 is an image obtained from the first detection wavelength. (b) of FIG. 3 is an image obtained from the second detection wavelength. (c) of FIG. 3 is an image in which (a) and (b) of FIG. 3 were merged. In this case, it was impossible to distinguish between the histone and keratin proteins because the emission spectra of the two fluorescent materials overlap. (d), (e), and (f) of FIG. 3 illustrate signal unmixing images based on Kullback-Leibler divergence. In this case, (d) of FIG. 3 is the first channel image (including only a histone protein signal). (e) of FIG. 3 is the second channel image (including only a keratin protein signal). (f) of FIG. 3 is an image in which (d) and (e) of FIG. 3 were merged. (g), (h), and (i) of FIG. 3 are signal unmixing images based on cross-entropy. In this case, (g) of FIG. 3 is the first channel image (including only a histone protein signal). (h) of FIG. 3 is the second channel image (including only a keratin protein signal). (i) of FIG. 3 is an image in which (g) and (h) of FIG. 3 were merged. (j), (k), and (l) of FIG. 3 illustrate signal unmixing images based on Rand-index. In this case, (j) of FIG. 3 is the first channel image (including only a histone protein signal). (k) of FIG. 3 is the second channel image (including only a keratin protein signal). (l) of FIG. 3 is an image in which (j) and (k) of FIG. 3 were merged.

FIG. 4 illustrates simulation verification results in a mouse brain tissue sample, and illustrates the results in which two images were obtained by composing GFAP and laminB1 protein images obtained from the mouse brain tissue sample at different ratios and the fluorescent signal unmixing technology based on a joint histogram was applied to the two images. (a), (b) and (c) of FIG. 4 illustrates images synthesized before signal unmixing. In this case, (a) of FIG. 4 is the first synthesis image. (b) of FIG. 4 is the second synthesis image. (c) of FIG. 4 is an image in which (a) and (b) of FIG. 4 were merged. In this case, it was impossible to distinguish between GFAP and laminB1 proteins because the signals of the two protein are mixed in the two images of (a) and (b) of FIG. 4. (d), (e), and (f) of FIG. 4 are signal unmixing images based on Kullback-Leibler divergence. In this case, (d) of FIG. 4 is the first channel image (including only a GFAP protein signal). (e) of FIG. 4 is the second channel image (including only a LaminB1 protein signal). (f) of FIG. 4 is an image in which (d) and (e) of FIG. 4 were merged. (g), (h), and (i) of FIG. 4 are signal unmixing images based on cross-entropy. In this case, (g) of FIG. 4 is the first channel image (including only a GFAP protein signal). (h) of FIG. 4 is the second channel image (including only a LaminB1 protein signal). (i) of FIG. 4 is an image in which (g) and (h) of FIG. 4 were merged. (j), (k), and (l) of FIG. 4 are signal unmixing images based on Rand-index. In this case, (j) of FIG. 4 is the first channel image (including only a GFAP protein signal). (k) of FIG. 4 is the second channel image (including only a LaminB1 protein signal). (l) of FIG. 4 is an image in which (j) and (k) of FIG. 4 were merged.

To sum up, the present disclosure proposes the method and device for unmixing fluorescent signals based on a joint histogram. According to the present disclosure, fluorescent materials having similar emission spectra can be distinguished based on a joint histogram. That is, according to the present disclosure, an imaging process can be minimized and fluorescent materials can be distinguished through the minimization of a joint histogram index. Specifically, according to the present disclosure, N types of fluorescent materials can be distinguished through only N-times imaging processes. In addition, in the present disclosure, mathematical complexity for distinguishing between fluorescent materials can be greatly reduced and the accuracy of the distinguishment can also be improved through the minimization of a joint histogram index. Furthermore, according to the present disclosure, fluorescent materials can be simultaneously distinguished through only one dying for biomolecules without repetitive dyeing. Accordingly, according to the present disclosure, biomolecules can be efficiently monitored because fluorescent materials having similar emission spectra can be efficiently distinguished. Accordingly, it will be possible to recommend optimal immuno-oncology and develop new immuno-oncology because low-cost, high-efficiency, and no-damage spatial profiling is possible.

A method of the electronic device 100 according to an embodiment of the present disclosure may include a step (step 210) of obtaining a plurality of images of a plurality of fluorescent materials marked in different biomolecules, and a step (step 220 to step 270) of unmixing signals of the fluorescent materials based on at least one joint histogram index defined between the images of each of pairs each including two or more of the obtained images.

According to the present disclosure, the joint histogram index may include at least one of Kullback-Leibler divergence, cross-entropy, or Rand-index.

According to the present disclosure, the step (step 220 to step 270) of unmixing the signals of the fluorescent materials may include a step (step 220 and step 230) of defining a loss function corresponding to the images of each pair based on the joint histogram index, a step (step 240) of calculating variables $\hat{\alpha}$ and $\hat{\beta}$ that minimize the loss function, and a step (step 250) of updating the obtained images by using the variables $\hat{\alpha}$ and $\hat{\beta}$.

According to the present disclosure, the step (step 220 to step 270) of unmixing the signals of the fluorescent materials may be repeated based on images obtained from the updated images.

According to the present disclosure, the step (step 220 to step 270) of unmixing the signals of the fluorescent materials may be repeated by a predetermined number.

According to the present disclosure, the step (step 210) of obtaining the plurality of images may include a step of obtaining the plurality of images from a detection wavelength in which emission spectra of the plurality of fluorescent materials overlap.

According to the present disclosure, the detection wavelength may be set to include high points in the emission spectra.

The electronic device 100 according to an embodiment of the present disclosure may include the memory 140, and the processor 150 connected to the memory 140 and configured to execute at least one instruction that is stored in the memory 140.

According to the present disclosure, the processor 150 may be configured to obtain a plurality of images of a plurality of fluorescent materials marked in different biomolecules, and to unmix signals of the fluorescent materials based on at least one joint histogram index defined between the images of each of pairs each including two or more of the obtained images.

According to the present disclosure, the joint histogram index may include at least one of Kullback-Leibler divergence, cross-entropy, or Rand-index.

According to the present disclosure, the processor 150 may be configured to define a loss function corresponding to the images of each pair based on the joint histogram index, calculate variables $\hat{\alpha}$ and $\hat{\beta}$ that minimize the loss function, and update the obtained images by using the variables $\hat{\alpha}$ and $\hat{\beta}$.

According to the present disclosure, the processor 150 may be configured to repeat an operation of unmixing the signals of the fluorescent materials may be repeated based on images obtained from the updated images.

According to the present disclosure, the processor 150 may be configured to repeat an operation of unmixing the signals of the fluorescent materials may be repeated by a predetermined number.

According to the present disclosure, the processor 150 may be configured to obtain the plurality of images from a detection wavelength in which emission spectra of the plurality of fluorescent materials overlap.

According to the present disclosure, the detection wavelength may be set to include high points in the emission spectra.

The present disclosure may be applied to all fields in which the multi-molecular spatial profiling technology is used, and has marketability in a corresponding field. Such fields include the following fields.

The first field is a multi-molecular spatial profiling microscope development field. A fluorescent microscope is very commonly used in research fields, such as biology, medicine, and pharmaceuticals, around the globe, and a market size thereof continues to grow.

The second field is a multi-molecular spatial profiling kit development and service provision field. With the arrival of digital pathology, a demand for multi-molecular spatial profiling based on various fluorescent molecules tends to increase globally in the United States and Europe.

The third field is an artificial intelligence (AI)-based digital pathology diagnosis and drug conformity prediction service provision field. The existing diagnosis is very subjective and qualitative because a pathologist directly monitors and determines a patient bioptic sample through an optical microscope, and the accuracy of diagnosis depends on experiences and the ability of the pathologist. In contrast, digital pathology diagnosis is objective and quantitative in its diagnosis process because a bioptic sample is photographed by using a microscope to which a digital camera has been attached and is digitally imaged and then quantitatively analyzed by using a computer program. Accordingly, the FDA in the U.S. first approved a digital pathology system in 2017. A global market size of digital pathology continues to grow. In the near future, it is expected that AI will diagnose a disease more accurately and precisely than a person by learning and analyzing digital pathology diagnosis data obtained from many patient bioptic samples. Practically, in 2018, the FDA approved the selling of a medical device that diagnoses diabetic retinopathy by using AI software and an AI algorithm that helps the diagnosis of a wrist fracture of a patient. It is expected that AI will also provide a drug conformity prediction service for each patient in addition to the aforementioned precise diagnosis. The drug conformity prediction service is a service that recommends which one of the existing anti-cancer drug is the most appropriate for a patient by obtaining a digital pathology image of a tissue pathology sample from the patient and analyzing the digital pathology image. The market size of the AI pathology diagnosis and drug conformity prediction system may not be predicted because the system is not practically applied. However, in the near future, it is expected that the AI pathology diagnosis and drug conformity prediction system will substitute a significant part of the existing medical market.

The fourth field is a bio marker discovery area for the development of a new immune anti-cancer drug. Third-generation immuno-oncology is an innovative medicine that has a less side effect than the existing medicine and a wide effect in that it treats cancer by reinforcing the immune function of the human body and that its effect continues for a long period of time through the memory ability of the immune system. Active investment and research is currently carried out on the immuno-oncology as a next-generation anti-cancer drug, and the market size of the immuno-oncology also grows. In a process of developing a new immune anti-cancer drug, it is essential to verify medical efficacy of various types of cancer or to monitor a treatment effect of a drug. Accordingly, the importance of a bio marker, that is, a marker capable of predicting a treatment reaction and effect and objectively measuring the treatment reaction and effect is increased, and the market size of the bio marker also grows.

According to the present disclosure, the following expectancy effects are expected that in relation to the fields.

The primary expectancy effect is related to the multi-molecular spatial profiling equipment development field. According to the present disclosure, more biomolecules can be simultaneously monitored compared to the existing method in association with a common fluorescent microscope, pieces of multi-molecular spatial profiling equipment, and pieces of digital pathology equipment. Furthermore, a multi-molecular spatial profiling microscope that has been optimized for the present disclosure can also be developed. It is expected that the microscope optimized for the present disclosure will have the ability that is several times more excellent than the multi-molecular spatial profiling ability of the existing optical microscope. Accordingly, it is expected that the microscope optimized for the present disclosure will become a high value-added business because the microscope may be usefully used in biological and medical research, such as research institutes, hospitals, and companies.

The secondary expectancy effect is related to the multi-molecular spatial profiling development and multi-molecular spatial profiling service provision field. After the development of the microscope optimized for the present disclosure, it is expected that a service for quantitatively analyzing a large number of samples in a customer company at rapid rate can be provided.

The third expectancy effect is related to the AI-based digital pathology diagnosis and drug conformity prediction service provision field. Recently, research for analyzing the amount of expression of a specific protein and the type of cell for a patient by imaging various biomolecules within a pathology sample and integrating corresponding analysis data and the prognosis or treatment data of the patient into one is actively carried out. If digital pathology data of a living tissue that is obtained from universities, hospitals, or research institutes is accumulated, a more accurate pathology diagnosis service can be provided because AI learns the digital pathology data. Furthermore, it is expected that if a bioptic image and the prognosis or treatment records of a patient are integrated into one and AI is trained by the integrated information, which drug is suitable for the patient may be predicted from bioptic imaging.

The fourth expectancy effect is related to the bio marker discovery area for the development of a new immune anti-cancer drug. If more bio markers are simultaneously imaged, databased, and analyzed by AI, the possibility that a new medicine such as an immune anti-cancer drug will be developed can be increased because the time taken to develop a new medicine is reduced, a cost for the development of a new medicine is reduced, and a danger of a development failure is minimized. Furthermore, it is expected that a service for increasing efficiency of clinical trials through the prediction of a drug response of a patient or the rapid confirmation of a drug side effect can be provided.

Various embodiments of this document and the terms used in the embodiments are not intended to limit the technology described in this document to a specific embodiment, but should be construed as including various changes, equivalents and/or alternatives of a corresponding embodiment. In relation to the description of the drawings, similar reference numerals may be used in similar components. An expression of the singular number may include an expression of the plural number unless clearly defined otherwise in the context. In this document, an expression, such as "A or B", "at least one of A and/or B", "A, B, or C" or "at least one of A, B and/or C", may include all of possible combinations of items listed together. Expressions, such as "a first," "a second," "the first", and "the second", may modify corresponding components regardless of its sequence or importance, and are used to only distinguish one component from another component and do not limit corresponding components. When it is described that one (e.g., a first) component is "(functionally or communicatively) connected to" or "coupled with" the other (e.g., a second) component, one component may be directly connected to another component or may be connected to another component through another component (e.g., a third component.

According to various embodiments, each of the aforementioned elements may include a single entity or a plurality of entities. According to various embodiments, one or more of the aforementioned components or steps may be omitted or one or more other components or steps may be added. Alternatively or additionally, a plurality of components may be integrated into a single component. In such a case, the integrated component may identically or similarly perform a function performed by a corresponding one of the plurality of components before one or more functions of each of the plurality of components are integrated. According to various embodiments, steps performed by a module, a program or another component may be executed sequentially, in parallel, iteratively or heuristically, or one or more of the steps may be executed in different order or may be omitted, or one or more other steps may be added.

The embodiments of the disclosure in which an exclusive property or privilege is claimed are defined as follows:

1. A method of an electronic device, comprising:
    obtaining a plurality of images of a plurality of fluorescent materials marked in different biomolecules, and
    unmixing signals of the fluorescent materials based on at least one joint histogram index defined between the images of each of pairs each comprising two or more of the obtained images,
    wherein the unmixing comprises:
    (1) defining a loss function corresponding to each pair of images based on the joint histogram index;
    (2) calculating variables that minimize the loss function; and
    (3) updating the obtained images by using the variables, wherein (1) to (3) are repeated for each pair of images based on the images updated in (3).

2. The method of claim 1, wherein the unmixing of the signals of the fluorescent materials is repeated based on images obtained from the updated images.

3. The method of claim 1, wherein the unmixing of the signals of the fluorescent materials is repeated by a predetermined number.

4. The method of claim 1, wherein the obtaining of the plurality of images comprises obtaining the plurality of images from a detection wavelength in which emission spectra of the plurality of fluorescent materials overlap.

5. The method of claim 4, wherein the detection wavelength is set to comprise high points in the emission spectra.

6. The method of claim 1, wherein the joint histogram index comprises Kullback-Leibler divergence.

7. The method of claim 1, wherein the joint histogram index comprises cross-entropy.

8. The method of claim 1, wherein the joint histogram index comprises Rand-index.

9. An electronic device comprising:
    a memory; and
    a processor connected to the memory and configured to execute at least one instruction that is stored in the memory,
    wherein the processor is configured to:
    obtain a plurality of images of a plurality of fluorescent materials marked in different biomolecules, and
    unmix signals of the fluorescent materials based on at least one joint histogram index defined between the images of each of pairs each comprising two or more of the obtained images,
    wherein the processor is configured to unmix the signals of the fluorescent materials by:
    (1) defining a loss function corresponding to each pair of images based on the joint histogram index;
    (2) calculating variables that minimize the loss function; and
    (3) updating the obtained images by using the variables, wherein (1) to (3) are repeated for each pair of images based on the images updated in (3).

10. The electronic device of claim 8, wherein the joint histogram index comprises at least one of Kullback-Leibler divergence, cross-entropy, or Rand-index.

11. The electronic device of claim 9, wherein an operation of unmixing the signals of the fluorescent materials is repeated a predetermined number of times.

12. The electronic device of claim 9, wherein the processor is configured to obtain the plurality of images from a detection wavelength in which emission spectra of the plurality of fluorescent materials overlap.

13. The electronic device of claim 12, wherein the detection wavelength is set to comprise high points in the emission spectra.

14. A non-transitory computer-readable storage medium storing a computer program which enables an electronic device to perform a method, the method comprising:
   obtaining a plurality of images of a plurality of fluorescent materials marked in different biomolecules, and
   unmixing signals of the fluorescent materials based on at least one joint histogram index defined between the images of each of pairs each comprising two or more of the obtained images,
   wherein the unmixing comprises:
   (1) defining a loss function corresponding to each pair of images based on the joint histogram index;
   (2) calculating variables that minimize the loss function; and
   (3) updating the obtained images by using the variables, wherein (1) to (3) are repeated for each pair of images based on the images updated in (3).

15. The non-transitory computer-readable storage medium of claim 14, wherein the joint histogram index comprises at least one of Kullback-Leibler divergence, cross-entropy, or Rand-index.

16. The non-transitory computer-readable storage medium of claim 14, wherein the unmixing of the signals of the fluorescent materials is repeated by a predetermined number.

17. The non-transitory computer-readable storage medium of claim 14, wherein the obtaining of the plurality of images comprises obtaining the plurality of images from a detection wavelength in which emission spectra of the plurality of fluorescent materials overlap.

* * * * *